(12) United States Patent
Michelsen et al.

(10) Patent No.: US 10,783,502 B2
(45) Date of Patent: Sep. 22, 2020

(54) MULTIPLE-ENTITY TRANSACTION SYSTEMS AND METHODS

(71) Applicant: The Western Union Company, Englewood, CO (US)

(72) Inventors: Michael Michelsen, Arvada, CO (US); Kurt Hansen, Castle Rock, CO (US); Dean A. Seifert, Parker, CO (US); Kenneth Algiene, Littleton, CO (US)

(73) Assignee: The Western Union Company, Denver, CO (US)

( * ) Notice: Subject to any disclaimer, the term of this patent is extended or adjusted under 35 U.S.C. 154(b) by 289 days.

(21) Appl. No.: 14/450,435

(22) Filed: Aug. 4, 2014

(65) Prior Publication Data

US 2015/0073979 A1  Mar. 12, 2015

Related U.S. Application Data (63) Continuation of application No. 13/251,531, filed on Oct. 3, 2011, now Pat. No. 8,799,154, which is a
(Continued)

(51) Int. Cl.
*G06Q 40/00* (2012.01)
*G06Q 20/10* (2012.01)
(Continued)

(52) U.S. Cl.
CPC ............ *G06Q 20/10* (2013.01); *G06Q 10/00* (2013.01); *G06Q 20/102* (2013.01);
(Continued)

(58) Field of Classification Search
None
See application file for complete search history.

(56) References Cited

U.S. PATENT DOCUMENTS 3,599,151 A  8/1971 Harr
3,833,395 A  9/1974 Gosnell
(Continued)

FOREIGN PATENT DOCUMENTS

EP  0481135  4/1992
EP  0949596  10/1999
(Continued)

OTHER PUBLICATIONS

Author Unknown, "Funds-transfer option: Outsourcing or commitment," Banking Management, Jan./Feb. 1995, vol. 71, No. 1, 1 page.
(Continued)

*Primary Examiner* — Jason Borlinghaus
(74) *Attorney, Agent, or Firm* — Kilpatrick Townsend & Stockton, LLP (57) ABSTRACT

Methods and systems are provided for performing a funds transfer. The method may include determining which of a plurality of different funds-transfer companies is able to complete the funds transfer in accordance with defined parameters. The method may also include determining a default service fee charged for the funds transfer by a funds-transfer company of a subset of the plurality of different funds-transfer companies. The method may additionally include transmitting to at least one funds-transfer company of the subset of the plurality of different funds-transfer companies details of the funds transfer, where the details of the funds-transfer comprises the default service fee. The method may furthermore include transmitting an identification of the subset of the plurality of different funds-transfer companies, each of which is capable of completing the funds transfer in accordance with the defined parameters, the subset including at least two of the plurality of different funds-transfer companies.

20 Claims, 6 Drawing Sheets

Related U.S. Application Data continuation of application No. 10/289,130, filed on Nov. 6, 2002, now Pat. No. 8,032,452.

(51) Int. Cl.
*G07F 19/00* (2006.01)
*G06Q 10/00* (2012.01)
*G06Q 40/02* (2012.01)
*G06Q 20/20* (2012.01)

(52) U.S. Cl.
CPC ........... *G06Q 20/204* (2013.01); *G06Q 40/00* (2013.01); *G06Q 40/02* (2013.01); *G07F 19/20* (2013.01); *G07F 19/203* (2013.01)

(56) References Cited

U.S. PATENT DOCUMENTS

| | | |
|---|---|---|
| 4,321,672 A | 3/1982 | Braun et al. |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |
| 4,722,554 A | 2/1988 | Pettit |
| 4,812,628 A | 3/1989 | Boston et al. |
| 4,902,881 A | 2/1990 | Janku |
| 4,961,142 A | 10/1990 | Elliott et al. |
| 5,021,967 A | 6/1991 | Smith |
| 5,053,607 A | 10/1991 | Carlson et al. |
| 5,119,293 A | 6/1992 | Hammond |
| 5,175,682 A | 12/1992 | Higashiyama et al. |
| 5,220,501 A | 8/1993 | Lawlor |
| 5,233,167 A | 8/1993 | Markman et al. |
| 5,367,452 A | 11/1994 | Gallery et al. |
| 5,408,077 A | 4/1995 | Campo et al. |
| 5,426,594 A | 6/1995 | Wright |
| 5,448,043 A | 9/1995 | Nakano et al. |
| 5,453,601 A | 9/1995 | Rosen |
| 5,464,971 A | 11/1995 | Sutcliffe et al. |
| 5,477,037 A | 12/1995 | Berger |
| 5,484,988 A | 1/1996 | Hills et al. |
| 5,491,325 A | 2/1996 | Huang |
| 5,504,677 A | 4/1996 | Pollin |
| 5,510,979 A | 4/1996 | Moderi et al. |
| 5,555,496 A | 9/1996 | Tackberry |
| 5,570,465 A | 10/1996 | Tsakanikas |
| 5,577,109 A | 11/1996 | Stimson et al. |
| 5,622,388 A | 4/1997 | Alcordo |
| 5,650,604 A | 7/1997 | Marcous et al. |
| 5,659,165 A | 8/1997 | Jennings et al. |
| 5,677,955 A | 10/1997 | Doggett et al. |
| 5,679,940 A | 10/1997 | Templeton et al. |
| 5,699,528 A | 12/1997 | Hogan |
| 5,717,868 A | 2/1998 | James |
| 5,745,886 A | 4/1998 | Rosen |
| 5,757,917 A | 5/1998 | Rose |
| 5,774,879 A | 6/1998 | Custy |
| 5,794,207 A | 8/1998 | Walker et al. |
| 5,815,657 A | 9/1998 | Williams et al. |
| 5,825,617 A | 10/1998 | Kochis et al. |
| 5,826,241 A | 10/1998 | Stein |
| 5,828,875 A | 10/1998 | Halvarsson et al. |
| 5,832,463 A | 11/1998 | Funk |
| 5,857,201 A | 1/1999 | Wright, Jr. et al. |
| 5,875,435 A | 2/1999 | Brown |
| 5,878,211 A | 3/1999 | Delagrange et al. |
| 5,893,080 A | 4/1999 | McGurf |
| 5,896,298 A | 4/1999 | Ritcher |
| 5,897,625 A | 4/1999 | Gustin et al. |
| 5,898,154 A | 4/1999 | Rosen |
| 5,910,986 A | 6/1999 | Ballard |
| 5,937,396 A | 8/1999 | Konya |
| 5,949,044 A | 9/1999 | Walker |
| 5,953,709 A | 9/1999 | Gilbert et al. |
| 5,960,412 A | 9/1999 | Tackberry |
| 5,963,647 A | 10/1999 | Downing et al. |
| 5,983,647 A | 10/1999 | Downing et al. |
| 5,987,426 A | 11/1999 | Goodwin |
| 5,993,047 A | 11/1999 | Novogrod et al. |
| 6,012,048 A | 1/2000 | Gustin et al. |
| 6,015,087 A | 1/2000 | Seifert et al. |
| 6,029,150 A | 2/2000 | Kravitz |
| 6,030,000 A | 2/2000 | Diamond |
| 6,032,133 A | 2/2000 | Hilt |
| 6,032,137 A | 2/2000 | Ballard |
| 6,039,245 A | 3/2000 | Symonds et al. |
| 6,044,360 A | 3/2000 | Picciallo |
| 6,045,039 A | 4/2000 | Stinson et al. |
| 6,058,417 A | 5/2000 | Hess et al. |
| 6,064,990 A | 5/2000 | Goldsmith |
| 6,070,798 A | 6/2000 | Nethery |
| 6,076,074 A | 6/2000 | Cotton et al. |
| 6,088,684 A | 7/2000 | Custy et al. |
| 6,097,834 A | 8/2000 | Krouse et al. |
| 6,098,053 A | 8/2000 | Slater |
| 6,106,020 A | 8/2000 | Leef et al. |
| 6,119,106 A | 9/2000 | Merskey et al. |
| 6,122,625 A | 9/2000 | Rosen |
| 6,145,738 A | 11/2000 | Stinson et al. |
| 6,149,055 A | 11/2000 | Gatto |
| 6,149,056 A | 11/2000 | Stinson et al. |
| 6,164,528 A | 12/2000 | Hills et al. |
| 6,175,823 B1 | 1/2001 | Dusen |
| 6,193,152 B1 | 2/2001 | Fernando et al. |
| 6,199,761 B1 | 3/2001 | Drexler |
| 6,206,283 B1 | 3/2001 | Bansal et al. |
| 6,223,168 B1 | 4/2001 | McGurl et al. |
| 6,246,996 B1 | 6/2001 | Stein et al. |
| 6,286,756 B1 | 9/2001 | Stinson et al. |
| 6,292,789 B1 | 9/2001 | Schutzer |
| 6,305,603 B1 | 10/2001 | Grunbok, Jr. et al. |
| 6,305,604 B1 | 10/2001 | Ono |
| 6,308,887 B1 | 10/2001 | Korman et al. |
| 6,327,575 B1 | 10/2001 | Katz |
| 6,321,984 B1 | 11/2001 | McCall et al. |
| 6,327,570 B1 | 12/2001 | Stevens |
| 6,354,490 B1 | 3/2002 | Weiss et al. |
| 6,360,254 B1 | 3/2002 | Linden |
| 6,367,693 B1 | 4/2002 | Novogrod |
| 6,385,594 B1 | 5/2002 | Lebda et al. |
| 6,415,271 B1 | 7/2002 | Turk et al. |
| 6,484,936 B1 | 11/2002 | Nicoli et al. |
| 6,488,203 B1 | 12/2002 | Stoutenburg et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,554,184 B1 | 4/2003 | Amos |
| 6,598,028 B1 | 7/2003 | Sullivan et al. |
| 6,704,039 B2 | 3/2004 | Pena |
| 6,721,715 B2 | 4/2004 | Nemzow |
| 6,736,314 B2 | 5/2004 | Cooper et al. |
| 6,814,282 B2 | 11/2004 | Seifert et al. |
| 6,827,260 B2 | 12/2004 | Stoutenburg et al. |
| 6,886,742 B2 | 5/2005 | Stoutenburg et al. |
| 6,938,009 B1 | 8/2005 | Herbst et al. |
| 7,086,584 B2 | 8/2006 | Stoutenburg et al. |
| 7,600,673 B2 | 10/2009 | Stoutenburg et al. |
| 7,822,656 B2 | 10/2010 | Knight et al. |
| 8,032,452 B2 | 10/2011 | Michelsen et al. |
| 2001/0025264 A1 | 9/2001 | Deaddio et al. |
| 2001/0027436 A1 | 10/2001 | Tenembaum |
| 2001/0051876 A1 | 12/2001 | Seigel et al. |
| 2002/0032656 A1* | 3/2002 | Chen ................. G06Q 20/1085 705/43 |
| 2002/0055907 A1* | 5/2002 | Pater ..................... G06Q 20/04 705/39 |
| 2002/0095379 A1 | 7/2002 | Likourezos et al. |
| 2002/0111886 A1* | 8/2002 | Chenevich ............. G06Q 20/00 705/30 |
| 2003/0024979 A1 | 2/2003 | Hansen et al. |
| 2003/0046224 A1 | 3/2003 | Mujtaba et al. |
| 2003/0046225 A1* | 3/2003 | Yamaguchi ............ G06Q 20/10 705/39 |
| 2003/0074310 A1 | 4/2003 | Grovit et al. |
| 2003/0167237 A1 | 9/2003 | Degen et al. |

(56) References Cited

U.S. PATENT DOCUMENTS

FOREIGN PATENT DOCUMENTS

| EP | 1077436 | 2/2001 |
|---|---|---|
| WO | 00/22559 | 4/2000 |
| WO | 00/46725 | 4/2000 |
| WO | 00/67177 | 11/2000 |
| WO | 01/04816 | 1/2001 |
| WO | 01-04816 | 1/2001 |
| WO | 02/05195 | 1/2002 |

OTHER PUBLICATIONS

Author Unknown, "Newest Lend-X Release Provides Benefits to Both Lenders and Borrowers, Enhancing the Overall Online Loan Experience," LendingTree, Inc., [online] Jan. 7, 2002, [retrieved on Jun. 7, 2006]. Retrieved from: http://www.lendingtree.com/stm3/pressroom/PressReleaseDtl.asp?PRID=127, 4 pages.

Author Unknown, "Cracking the Code for Person-to-Person Payments," EFT Report, May 30, 2001, vol. 24, Iss. 11, 2 pages.

Michelsen, M, Jr., "Promoting online banking with an Internet kiosk," ABA Bank Marketing, Dec. 2002, vol. 34, No. 10, 1 page.

http://www.vfi-finance.com/tranz330.htm, Trans 330 Fast, Low-Cost Transaction Automation at the Point of Service, VeriFone Finance, Jan. 1999, pp. 1-3, especially pp. 1-2.

Business Wire, E-Commerce. Email and E-greeting Cards Combine in New Web Site Designed by Interactive Bureau•, Sep. 14, 1999 (abstract), (online) (retrieved on May 1, 2002). retrieved from PROQUEST Database. 2 pages.

PR Newswire, "GiftSpot.com Simplifies Gift-Giving on the Internet," Oct. 20, 1999 (abstract). (online) (retrieved on May 1, 2002), retrieved from PROQUEST Database. 5 pages.

x.com, Do More with Your Money, downloaded from website http://www.x.com., Feb. 7, 2000, 5 pages.

Dotbank, The Way to Send and Receive Money on the Internet, downloaded from website http://www.dotbank.com, Feb. 7, 2000, 6 pages.

Idealab Company. PayMe.com, downloaded from website http://ssl.idealab.com on Feb. 16, 2000, 7 pages.

Confinity. Inc .. PayPal.com. How PayPal.com Works, downloaded from website http://www.paypal.com on Feb. 7, 2000, 7 pages.

\* cited by examiner

Funds Transfer System

Companies That Send to Toronto Ctr:

|  | Amt | Exch. | Fee | Total |
|---|---|---|---|---|
| XY Corp. | C$150 | 0.6510 | US$0.75 | US$98.40 |
| XXZ Corp. | C$150 | 0.6315 | US$2.75 | US$97.48 |

320 — Submit

Fig. 3C

Funds Transfer System

Confirmation:
C$150 Funds Transfer Executed
to John Smith
in Toronto Ctr
with XXZ Corp.

US$97.48 Charged to BankA Acct 123-45-6789

MULTIPLE-ENTITY TRANSACTION SYSTEMS AND METHODS

CROSS-REFERENCES TO RELATED APPLICATIONS

This application is a continuation of U.S. patent application Ser. No. 13/251,531, filed Oct. 3, 2011, issued as U.S. Pat. No. 8,799,154, and entitled "MULTIPLE-ENTITY TRANSACTION SYSTEMS AND METHODS," which is a continuation of U.S. patent application Ser. No. 10/289,130, filed Nov. 6, 2002, issued as U.S. Pat. No. 8,032,452, and entitled "MULTIPLE-ENTITY TRANSACTION SYSTEMS AND METHODS." The entire disclosures of the above applications are hereby incorporated by reference, for all purposes, as if fully set forth herein.

BACKGROUND OF THE INVENTION

This application relates generally to financial transactions. More specifically, this application relates to systems and methods for coordinating transactions that may be executed by multiple entities.

The marketplace for many financial-services industries includes both large companies that offer a broad range of services and smaller companies that offer more focused services. While the availability of a diverse range of services may be considered to be a positive feature for consumers of these services in the abstract, the very diversity of services often makes it difficult for consumers to identify the most suitable company to use for specific transactions. This is evident, for example, in the money-transfer industry, which generally provides services that allow a person at one location to transfer funds to a person at a different location. A variety of different funds-transfer companies provide different levels of service, with some smaller companies providing relatively few geographical locations, and perhaps only domestic locations, for initiating and receiving the transferred funds; some larger companies provide a greater number of geographical locations, even including international locations and providing currency-exchange services in addition to the bare money-transfer services themselves.

Generally, each of these companies has a different service-fee structure so that one or another company's services may be more advantageous for a customer depending on the specific nature of the transaction. It is, however, cumbersome and inconvenient for customers to determine for any given transaction which company is most suitable, taking into consideration such factors as geographical locations served, the size of service charges, whether currency conversions are performed, the currency-conversion rate offered, and the like. There is, therefore, a general need in the art to provide methods and systems that permit consumers to perform comparisons of different offerings in a convenient manner.

BRIEF SUMMARY OF THE INVENTION

Embodiments of the invention therefore provide methods and systems for performing financial transactions that permit customers to select one of a group of companies for executing the transactions. In some embodiments, the financial transactions comprise funds-transfer transactions, although the principles of the invention may alternatively be applied to other types of financial transactions. In embodiments of the invention, information regarding fees charged by the group of companies and selections of those companies by customers may be exchanged between a host system and a funds-transfer initiating system. Once the selection has been made, information regarding the payout of the funds transfer may be communicated to an appropriate payout system.

Thus, in a first set of embodiments, a method is provided for coordinating a funds transfer. A request to transfer funds to a recipient is received from a requester, such as at a funds-transfer initiating system and a list of funds-transfer companies that may be selected to transfer the funds is communicated. In some embodiments, this list may be displayed to the requester, although in alternative embodiments only a selected one of the funds-transfer companies is displayed to the request. If the requester is presented with the list, a selection of one of the funds-transfer companies may be received and the request and selection transmitted to a host system. In some embodiments, the funds-transfer initiating system may additionally collect the funds to be transferred. A desired retrieval location may also be received, with the funds-transfer initiating system communicating a list of funds-transfer companies that offer funds-transfer services to the desired retrieval location. A list of prices charged for transferring funds by each of the funds-transfer companies may be communicated and, in some embodiments a price for one of the funds-transfer companies may be modified before it is displayed to the requester. In instances where the request to transfer funds includes a foreign-currency-exchange request, the list of prices may include a list of foreign-currency exchange rates offered by each of the funds-transfer companies.

In a second set of embodiments, a method is provided for performing a funds transfer. A request to transfer funds to a recipient is received at a host system, as well as an identification of a selected funds-transfer company chosen from a group of funds-transfer companies and a request to provide the funds to the recipient. Information related to the request is transmitted from the host system. The request to transfer funds may include an identification of a retrieval location, with a list of funds-transfer companies that offer funds-transfer services to the retrieval location further being transmitted from the host system to a funds-transfer initiating system. In addition, a list of prices charged by each of the group of funds-transfer companies may be transmitted. In cases where the request to transfer funds involves a foreign-currency exchange, the list of prices may include a list of foreign-currency exchange rates offered by each of the group of funds-transfer companies. Suitable fees may be charged to the funds-transfer companies for their inclusion in the list and/or for use of the host system.

The host system may be embodied as a computer system whose operation is directed by a computer-readable program on a computer-readable storage medium. Such a computer system may include a communications system and a processor, with the computer-readable program having instructions for operating the computer system to perform a funds transfer in accordance with the embodiments described above.

The funds-transfer initiating system may be implemented with a transaction device having a data-entry device, a memory, a communications device, and a processor coupled with the data-entry device, the memory, and the communications device. Such a transaction device may be configured to perform the methods described above. Examples of interfaces that may be comprised by the communications device include an Internet interface, a telephone interface, and a PDA interface, among others. In some embodiments, the transaction device may additionally comprise a cash issuer and/or a card issuer.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

The present invention is described in conjunction with the appended figures.

DETAILED DESCRIPTION OF THE INVENTION

Embodiments of the invention provide methods and systems for performing financial transactions that permit customers to select one of a group of companies for executing the transactions. In the discussion that follows, embodiments are illustrated with examples from the funds-transfer industry, although it will be evident to those of skill in the art that the same principles may be used in other financial-transaction industries. A typical funds-transfer transaction permits a sender at one geographical location to arrange for funds to be retrieved by a recipient at another geographical location. In some embodiments, the sender is provided with comparative information for companies that meet geographical location constraints for the locations of the sender and recipient. After reviewing the comparative information, the sender makes a selection of which company to use to execute the transaction. A host system that is used to provide the comparative information may additionally be used in the execution of the transaction. Such a capability may be particularly desirable for smaller companies, which may thereby use a much larger infrastructure for executing transactions provided by the host system that they would otherwise not be able to provide. In some instances, the availability of the host system for such functions may be provided in exchange for a fee. Accordingly, such embodiments have diverse advantages for customers, participant financial-transaction companies, and the host system.

Figure 1A:
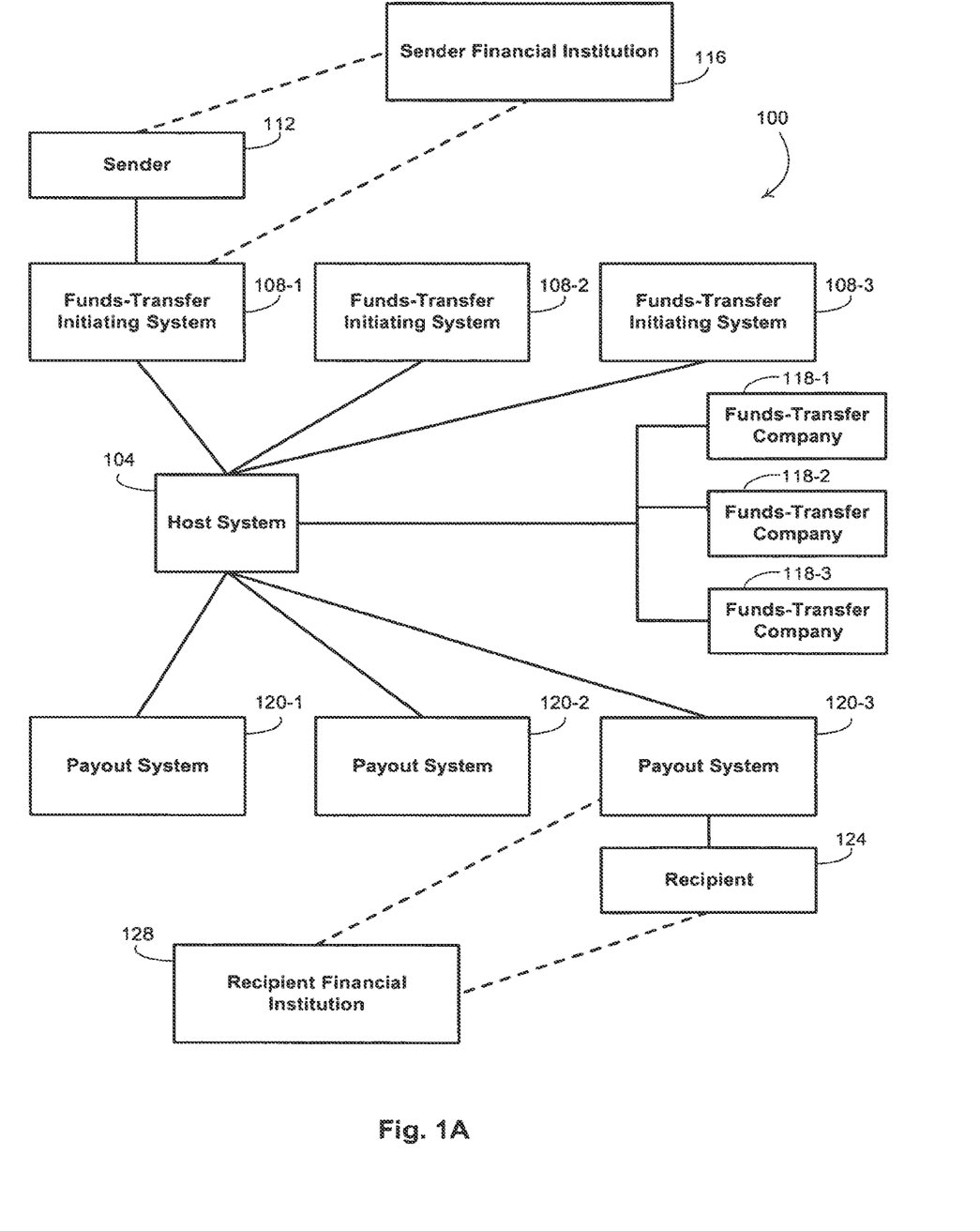
FIG. 1A is a block-diagram representation of an arrangement for implementing multiple-entity transaction systems and methods in accordance with an embodiment of the invention.

One structure that may be used to enable such embodiments is illustrated with the schematic diagram in FIG. 1A. Interaction between the various funds-transfer companies 118 whose services may be used is coordinated by a host system 104. In addition to being configured for interaction with the funds-transfer companies 118, the host system 104 is configured for interaction with a plurality of funds-transfer initiating systems 108 and payout systems 120. The general function of the funds-transfer initiating systems 108 is to provide an interface with a sender 112. This interface permits the sender 112 to enter information that specifies the nature of the funds-transfer transaction and to receive comparative information regarding suitable funds-transfer companies. The general function of the payout systems 120 is to provide an interface with a recipient 124 for collection of the transferred funds.

In FIG. 1A, the funds-transfer initiating systems 108, payout systems 120, and host system are shown separately for convenience. While in many instances, each of these systems may be separate, in other embodiments a single system may perform the functions of two of the types of systems or even of all three of the types of systems. For example, a single system may integrate the functions of a funds-transfer initiating system 108 and a payout system 120; an example of such a combined system is discussed below in connection with FIG. 1B. This permits a single location to act with senders 112 and recipients 124 in different funds-transfer transactions. In other instances, a single system may integrate the functions of the host system 104 and a payout system 120, or may integrate the functions of the host system 104 and a funds-transfer initiating system.

In addition, each of the funds-transfer initiating systems 108 and payout systems 120 may be managed by one of the funds-transfer companies 118. For example, these systems may be located at agent or representative locations that provide services on behalf of respective funds-transfer companies. In such instances, direct interaction with the funds-transfer initiating system 108 or with the payout system 120 may be performed by the agent or representative in accordance with a request from a customer. In other instances, direct interaction with the funds-transfer initiating system 108 or with the payout system may be possible by the customer, as described further below. The set of funds-transfer initiating systems 108 and payout systems 120 thus define a network of locations, with different portions of the network being managed by different funds-transfer companies 118. The host system 104 acts to coordinate activities among these multiple entities, thereby providing a greater diversity of options to customers.

In many instances, this greater diversity is accomplished through arrangements between or among different funds-transfer companies 118 for the use of their infrastructure or end-point services, including use of their payout systems. For example, in FIG. 1A the sender 112 is shown interacting with funds-transfer initiating system 108-1, which may be a system managed by funds-transfer company 118-1. There are a variety of reasons that could lead to the choice of the sender 112 to initiate a funds transfer at a location managed by funds-transfer company 118-1, such as the convenience of that location. The recipient 124 is shown interacting with payout system 120-3, which may be a system managed by funds-transfer company 118-3. When initiating the transfer, the sender 112 may choose to specify that the payout be at the location of payout system 120-3, perhaps because of its proximity to the recipient 124, even though it is managed by a different funds-transfer company than the initiating system 108-1. In some embodiments, the sender 112 may even decide that the mechanics of the transfer be implemented by funds-transfer company 118-2 because of advantageous service charges, currency-conversion rates, and the like.

The arrangement shown in FIG. 1A thus enables a funds-transfer transaction to be coordinated among multiple entities. Typically, this capability is coupled with a service-fee arrangement among the different entities and/or an entity that manages the host system. Such service fees may be imposed, for example, for the use of the infrastructure provided by a particular one of the entities, and may be passed onto the sender as part of a quoted service charge. Thus, for example, the sender 112 may pay a larger service charge for arranging to have the recipient 124 collect the transferred funds at payout system 120-3 than he would for arranging to have the recipient 124 collect the funds at a payout system controlled by funds-transfer company 118-1.

Infrastructure aspects that may be accessed by different funds-transfer companies 118 may include, for example, interconnections with financial institutions. Because of the financial nature of the transactions, such interconnections generally have strong security and encryption protocols. While larger funds-transfer companies may have access to such interconnections, smaller funds-transfer companies may instead rely on integration with the host system 104 to acquire access, often in exchange for a fee. This may particularly be the case for international or intercontinental connections used to support international or intercontinental transactions.

A portion of this infrastructure is indicated in FIG. 1A for a sender financial institution 116 and a recipient financial institution 128, although the infrastructure will generally comprise connections with a large number of financial institutions. Integration with these financial institutions permits a wider range of options to be made available to the sender 112 and recipient 128 when originating or collecting funds for the transfer. For example, if the sender financial institution 116 may be accessed by the funds-transfer initiating system 108-1, the sender 112 may pay for the transaction with a credit or debit instrument supported by the sender financial institution 116 in lieu of providing the funds by cash or its equivalent. Similarly, if the recipient financial institution 128 may be accessed by the payout system 120-3, the recipient 124 may elect for the transferred funds to be deposited with the recipient financial institution 128 instead of receiving the payout in cash or with a check.

A variety of different structures may be used for the funds-transfer initiating systems 108 and/or payout systems 120. Examples of such systems are described in detail in copending, commonly assigned U.S. patent application Ser. No. 10/206,661, entitled "MONEY TRANSFER SYSTEMS AND METHODS FOR TRAVELERS," filed Jul. 26, 2002, the entire disclosure of which is herein incorporated by reference for all purposes. For example, local provider terminals may be used to accept cash, credit cards, checks, debit cards, stored value cards, smart cards, and the like as part of the funds-transfer initiation and may also be used as payout devices to print a check, print a money order, credit a stored-value card, and the like. Examples of such terminals are described in the following commonly assigned applications, the entire disclosures of which are incorporated herein by reference for all purposes: U.S. Prov. Pat. Appl. No. 60/147,889, entitled "INTEGRATED POINT OF SALE, DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg.

In other embodiments, a kiosk terminal may alternatively be used to provide this functionality. An example of a structure of such a kiosk terminal is shown in schematically in FIG. 1B and designated as a combination of the funds-transfer initiating system and the payout system. It will thus be appreciated that such a kiosk terminal may be used to make payments to the recipient 124 as well as to receive funds from the sender 112. The kiosk includes a controller 150 that may communicate with various component devices such as a card reader 158, a card writer 160, a card issuer 162, a cash issuer 164, and a check printer 166. The kiosk terminal may include some or all of these devices.

Figure 1B:
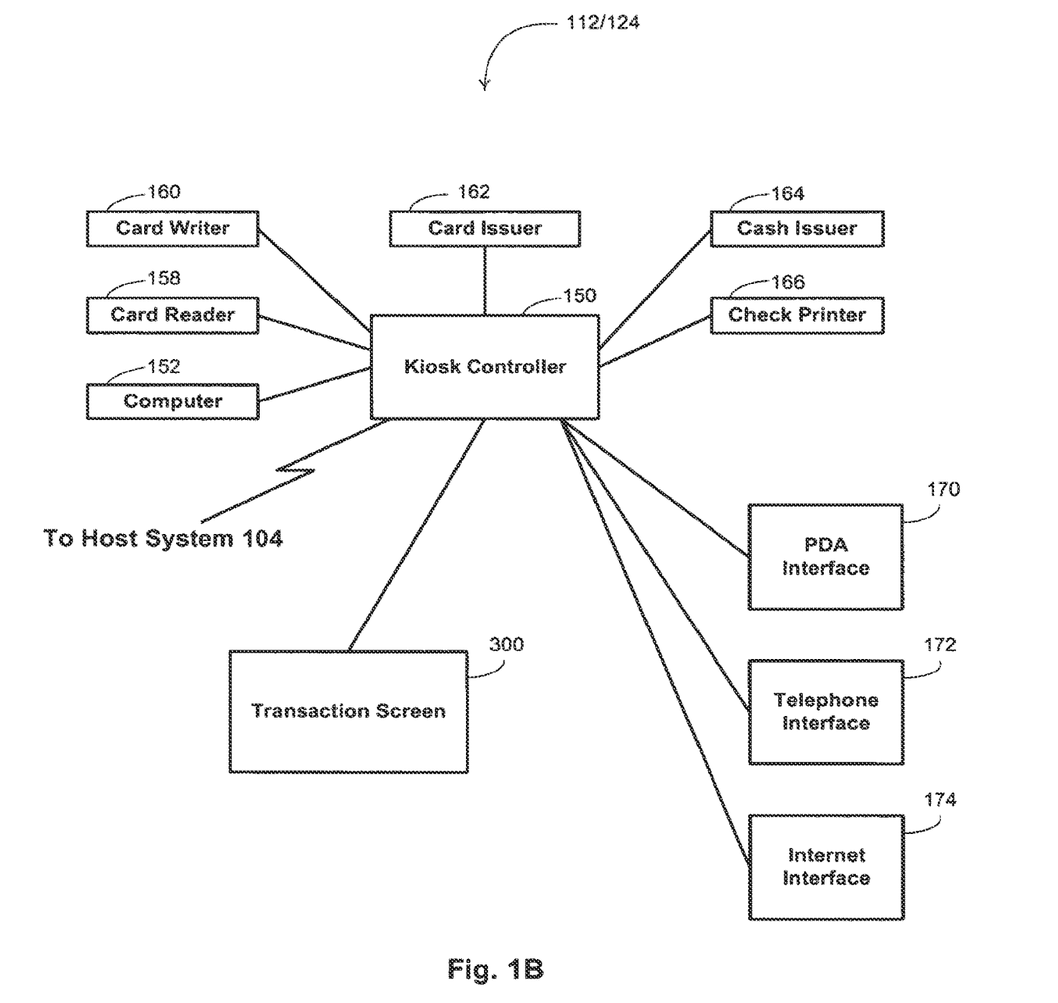
FIG. 1B is a schematic illustration of a device that may be used to collect and/or pay funds in accordance with embodiments of the invention.

The card reader 158 permits the entry of information such as where the sender 112 has a card identifying information common to many transactions initiated by the sender 112, such as the sender's name, identification number, and the like. These may be used to populate a transaction screen 300 as described below. The card reader 158 may also be used to extract information from credit cards, debit cards, smart cards, stored value cards, and the like in embodiments where the sender 112 wishes to use those instruments as a source of funds for the transfer. The card writer 160 similarly permits information to be encoded and stored on a variety of similar types of cards. This capability permits the kiosk to payout transferred funds in some embodiments by adding value to a stored-value card, smart card, and the like. In some cases, cards may be issued to the sender 112 or recipient 124 using the card issuer 162. For example, a customer card may be issued as part of the registration process of the sender 112, permitting the sender 112 to use the card rather than re-enter identification information for later transfers. The card issuer 162 may also be used to issue cards when making payments to recipients in the form of stored value cards, smart cards, cash cards, and the like. These may then be used at other kiosks or ATMs to withdraw the transferred funds.

The cash issuer 164 may be used to dispense cash directly to the recipient 124 after the identity of the recipient 124 has been confirmed, such as by having an identification card read by the card reader 158 and entering a personal identification number. Cash payouts may also be made by using the card reader 158 and cash issuer 164 in combination to redeem value from a card having stored value.

The kiosk terminal may also include connections for different interfaces that permit different types of interactions, including certain remote interactions, with customers. For example, a PDA interface 170 may permit a PDA device to be coupled to the kiosk terminal, allowing a transfer to be made directly from the sender's PDA, which may conveniently be preprogrammed with various information relating to the transaction, such as account numbers, information on the recipient 124, and the like. A telephone interface 172 may permit transactions to be staged by voice with an IVR system or with DTMF tones. In still other embodiments, an Internet interface 174 may permit transactions to be staged by customers over the Internet.

Figure 2:
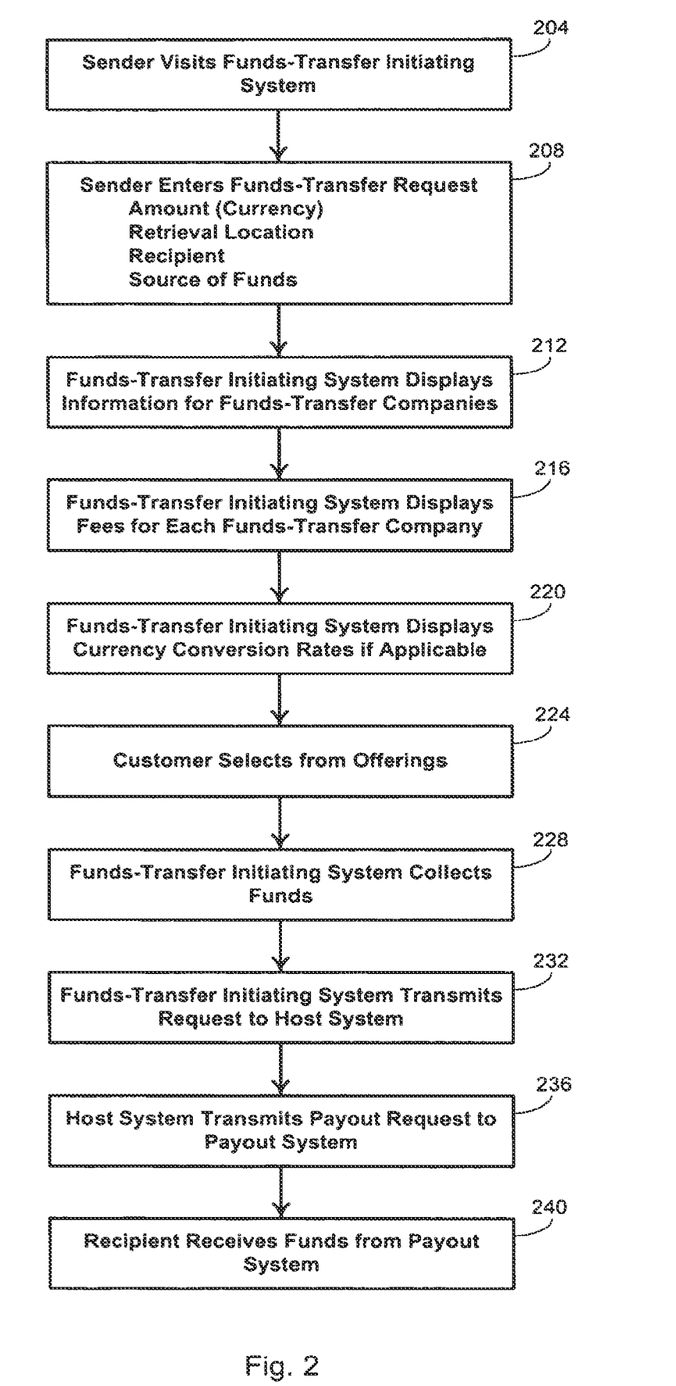
FIG. 2 is a flow diagram illustrating a method for performing a money-transfer transaction in accordance with an embodiment of the invention.

Regardless of the type of interface used by customers, transactions may be effected in similar ways. Examples of transactions effected with the arrangement shown in FIG. 1A are provided in the following discussion, referring simultaneously to FIG. 2 and FIGS. 3A-3D. FIG. 2 provides a flow diagram illustrating the aspects of the transaction and FIGS. 3A-3D provide examples of information that appears on a display device at different stages of the transaction. Such a display device may correspond to a transaction screen 300 comprised by the funds-transfer initiating system 112 or may correspond to a screen presented to customers on a PDA through a PDA connection, on a cell-phone display through a telephone interface, or on a monitor through an Internet connection; in instances where an interface is used without a display, such as through certain telephone connections, equivalent recorded voice commands may provide an alternative interface. The display device may present information to the sender 112 related to the transaction and may request the entry of information, such as with a keyboard, mouse, touchscreen, or any other suitable interface known to those of skill in the art. In alternative embodiments, the information may be collected by a clerk at a location of one of the funds-transfer companies, with the clerk entering the information into the funds-transfer initiating system 108 through a similar interface.

As indicated at block 204 of FIG. 2, a funds-transfer transaction begins in an embodiment with a visit by a sender 112 to a funds-transfer initiating system 108. A "visit" may be a visit to an agent or representative location, may be a personal visit to a kiosk terminal, or may be remote visit through one of the interface capabilities. Information regarding the funds-transfer request is collected at block 208, such as with the display 300 shown in FIG. 3A. Fields are provided on the display 300 to collect such information. Thus an amount field 304 permits the sender to specify the funds to be transferred, together with a specification of the currency in a currency field 306 if appropriate. A location field 308 permits a specification of a location where the recipient 124 can collect the transferred funds. The exemplary display shows the location field as a drop-down menu with general descriptions of the location, although in other embodiments the location may be specified in other ways, such as by ZIP code, specific address designation, telephone exchange, etc. The display also includes a recipient name field 312 for the sender 112 to identify the recipient 124. A source-of-funds field 316 may also be provided where the sender 112 is given the opportunity to provide the funds for the transfer in different ways. In instances where funds are provided in cash or its equivalent, the funds may be collected from the sender 112 by a clerk. In instances where funds are provided with one of the other means described above with respect to FIG. 1B, i.e. by credit card, debit card, smart card, stored-value card, etc., the corresponding capability of the funds-transfer initiating system 112 may be used. Once the information to define the transaction has been entered, the sender may click a submit button 320.

Figure 3A:
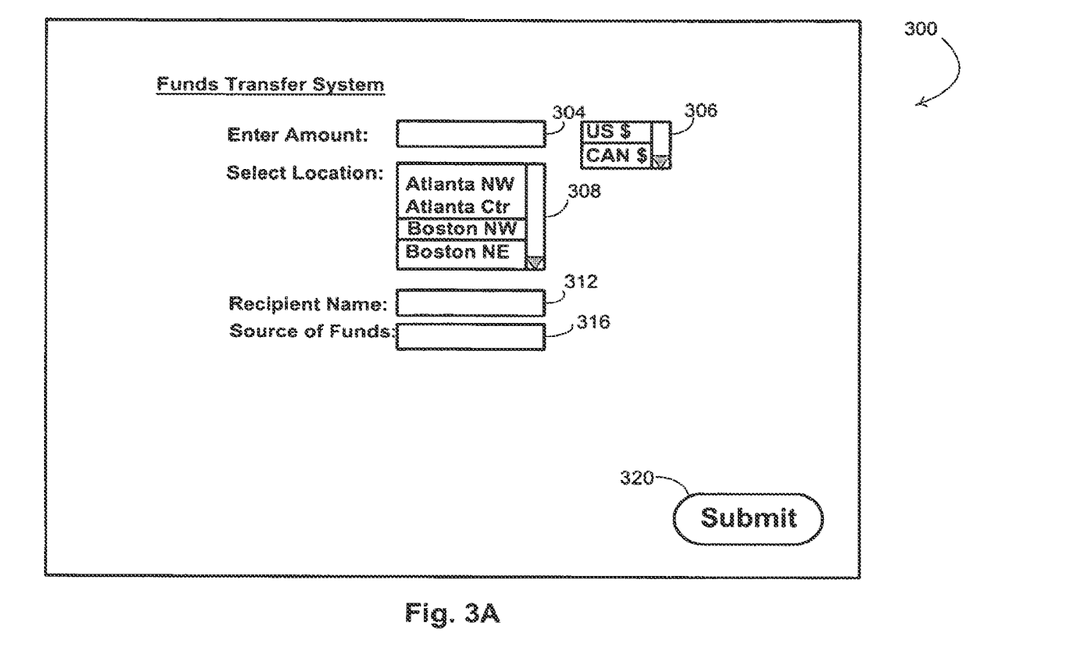
FIGS. 3A-3D are exemplary screen diagrams that may be displayed on a display screen during a money-transfer transaction.

The form of the interface shown in FIG. 3A is merely exemplary. Those of skill in the art will recognize that more sophisticated interfaces may be used and that the interfaces may be tailored to specific applications. For example, the location selection might be handled with a map interface controlled with touch-screen commands, a calculator function might be included, records may be maintained to facilitate identification of the sender, including through the use of biometric identifications, and various other enhancements may be incorporated.

After the parameters defining the desired transfer are specified by the sender 112, the funds-transfer initiating system 108 determines which of the funds-transfer companies 118 may complete the transfer and displays information from that determination at block 212. The content of the display may depend on the specific nature of the desired transfer. For example, in some embodiments, the system may be configured to display information only a selected one of the funds-transfer companies 118 and in other embodiments may be configured to display information for all of the funds-transfer companies that meet the specified criteria. Display of information for a single funds-transfer company may be appropriate where that funds-transfer company is using the backend arrangement of the infrastructure, but otherwise wishes to retain a distinct identity.

As indicated at block 216, the fees to effect the transfer may be displayed for each of the funds-transfer companies listed. The fees that are listed may be based on various types of information in different embodiments. For example, in one embodiment, the details of the funds-transfer transaction may be the only information used in determining the fees. In other instances, customer information may also be used, reflecting such factors as the frequency that a specific customer uses the system to give high-frequency customers more favorable rates. In other instances, exclusive or promotional pricing schemes may be presented for customers transferring funds to certain predetermined locations. Still other factors known to those of skill in the art may be accommodated in determining fees to be presented.

In one embodiment, a particular funds-transfer company that has paid a premium may be given a further opportunity to modify the fee presented to the sender before it is displayed. In such an embodiment, the fees calculated according to the default criteria are transmitted to the particular funds-transfer company for review and the that funds-transfer company may return a modified fee to be presented to the customer. The modified fee may be higher or lower than the fee calculated with the default criteria and will usually be determined automatically from the comparison fees by a program maintained by the particular funds-transfer company.

Figure 3B:
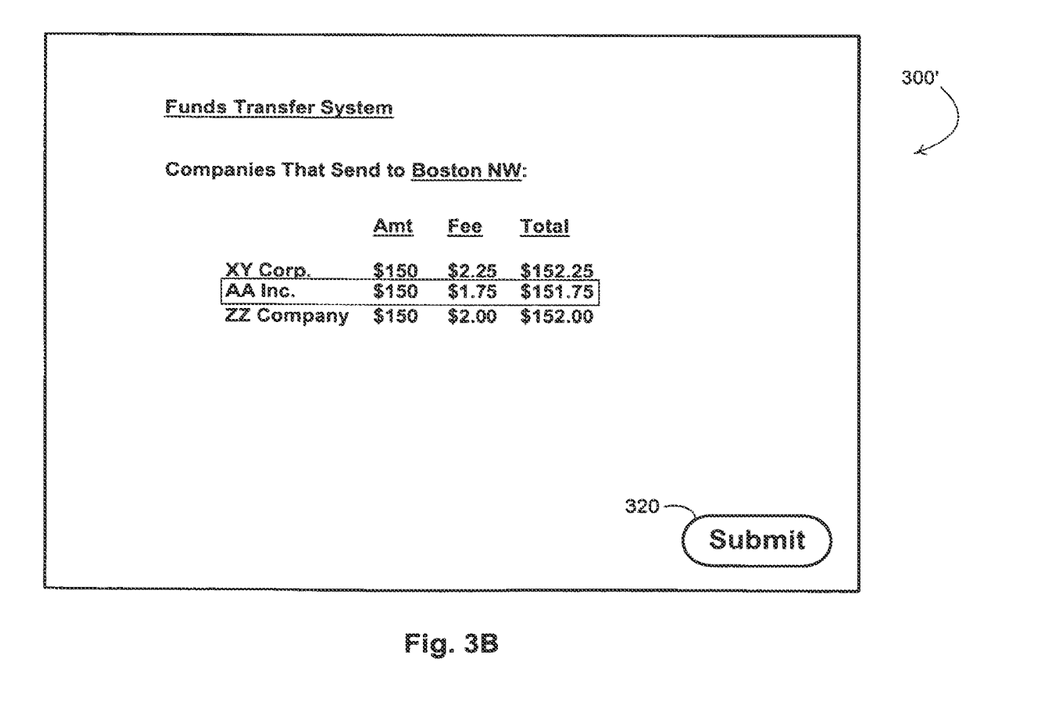

An example of a listing that includes proposed fees is provided in FIG. 3B for a domestic transfer within the United States on screen 300'. Three companies are identified as providing funds-transfer services between the location of the sender 112 and the identified desired recipient location. For each of the three companies, the amount to be transferred, the service fee to be charged to the sender 112 and the resulting total cost are displayed. As previously mentioned, the service fee to be charged to the sender 112 may partially represent costs being conveyed to the customer for use of an infrastructure by some of the companies. For example, AA Inc., which has the lowest service fee listed, may be a large company with widely distributed offices and a sufficient infrastructure to support the desired transfer. In contrast, XY Corp., which has the highest service fee listed, may be a smaller company that needs to use some of the AA Inc. infrastructure to effect the transfer. Thus, even if the sender decides to use XY Corp., perhaps because of name recognition, customer loyalty, or some other reason, AA Inc. may still benefit from the transaction through a fee charged to XY Corp. for use of its infrastructure.

Figure 3C:
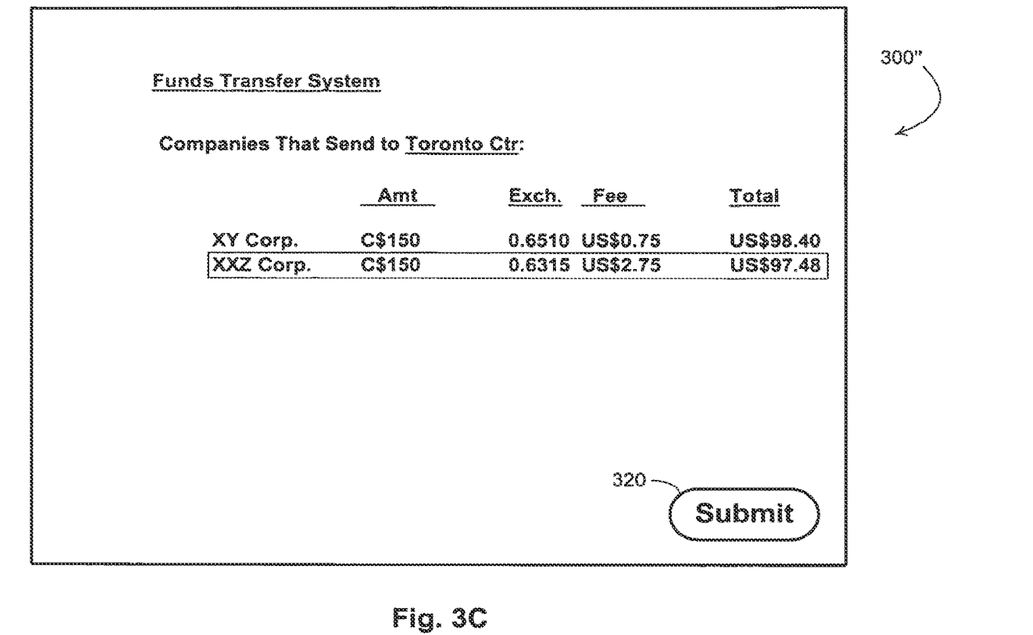

In other instances, the amount of information provided regarding the possible transactions may be different. For example, FIG. 3C shows an exemplary display for an international transfer, in this instance between a sender 112 in the United States and a recipient 124 in Canada. On screen 300", the amount to be transferred is thus expressed in Canadian dollars ("C$") and the total to be charged by each of the funds-transfer companies is expressed in U.S. dollars ("US$"). This total accounts for a currency-exchange rate and a service fee, both of which are displayed in accordance with blocks 216 and 220 of FIG. 2. The service fees charged by each of the. companies may reflect a portion of fees that they themselves must pay for use of an infrastructure to effect the transfer. In the example shown in FIG. 3C, the service fee to be charged by XXZ Corp. is significantly higher than that to be charged by XY Corp., perhaps as a result of additional fees charged to XXZ Corp. as described above. The currency-exchange rate to be charged by XXZ Corp. is, however, significantly lower than the currency-exchange rate to be charged by XY Corp. so that the overall cost for the transfer is lower for XY Corp.

In still other instances, transaction options may be included with the list presented to the sender that go beyond funds transfers. For example, many of the funds-transfer companies 118 may provide subsidiary services to supplement the transfers themselves, including such services as providing a telephone notification to the recipient 124 of the transfer, providing a notification to the sender 112 once the transfer has been collected, providing a singing-telegram feature to accompany the transfer, and the like. In some embodiments, the sender 112 may select a subsidiary service that is provided by a different funds-transfer company than the company selected to perform the transfer itself. For example, XY Corp. may be selected to perform the funds transfer, but does not offer a telephone-notification service that the sender 112 wants; the sender may then select XXZ Corp. to perform the telephone notification using its existing capabilities to do so. In such cases, reconciliation of the proportions of the fees due to each of the involved funds-transfer companies 118 may be made according to an agreement between them that is managed by the host system 104.

Thus, after reviewing the conditions for each of the funds-transfer companies 118 in the group displayed, the sender 112 makes a selection of which company to use for the transfer at block 224, as well as any other selections for subsidiary services. This may be done by highlighting one of the selections with cursor controls or a touchscreen such as shown in FIGS. 3B and 3C and executing the submit function 320. After the desired offering has been selected, the actual transaction is coordinated by the host system in accordance with protocols established by the selected funds-transfer company. Funds are collected from the sender at block 228, perhaps in cash or its equivalent by a clerk or automatically by issuing a debit instruction to the sender financial institution 116. The funds-transfer initiating system then transmits the request for the transfer to the host system 104 at block 232.

Reconciliation of the transfer in accordance with the selections made by the sender 112 is coordinated by the host system 104, including transmitting a payout request to the designated payout system at block 236. The host system 104 maintains information regarding agreements made with each of the funds-transfer companies reflecting negotiated rates for using the infrastructure and may also maintain information regarding agreements between the funds-transfer companies regarding negotiated rates for using parts of the infrastructure controlled by particular companies. For each transfer, the host system 104 determines how fees, revenue, and profit allotments are to be distributed among the different entities. These distributions are accumulated over a period of time, such as a day or week, with actual reconciliation being made according to the net amounts due to and from each of the entities at the end of that period.

Figure 3D:
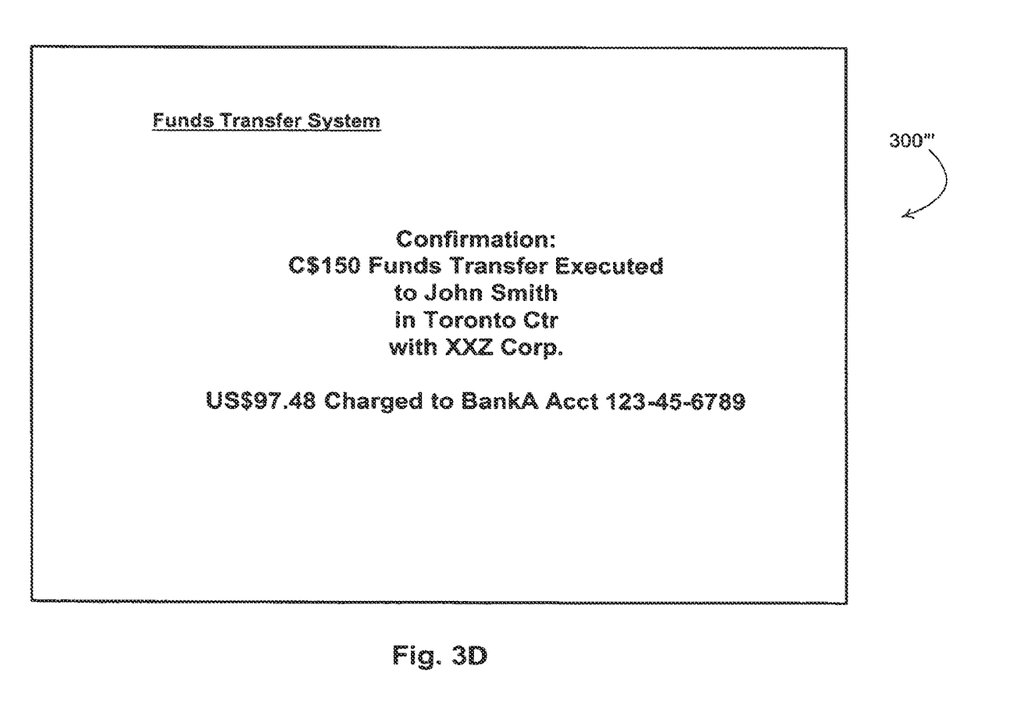

After the payout request has been successfully transmitted, a screen may be displayed to the sender 112 as shown in FIG. 3D to confirm the details of the transaction. A receipt may be printed on a printer connected with the funds-transfer initiating system or sent to the sender 112 electronically, depending on how the sender 112 has interfaced with the system. After receipt of the payout request, the recipient 124 may collect the transferred funds from the payout system 120. In some instances, such collection may be done in person, with the recipient being issued cash, a check, or equivalent by a clerk. In other instances, the payout may be provided directly as a credit to an account of the recipient's held at the recipient financial institution 128, credit to a stored-value card, and the like.

Figure 4:
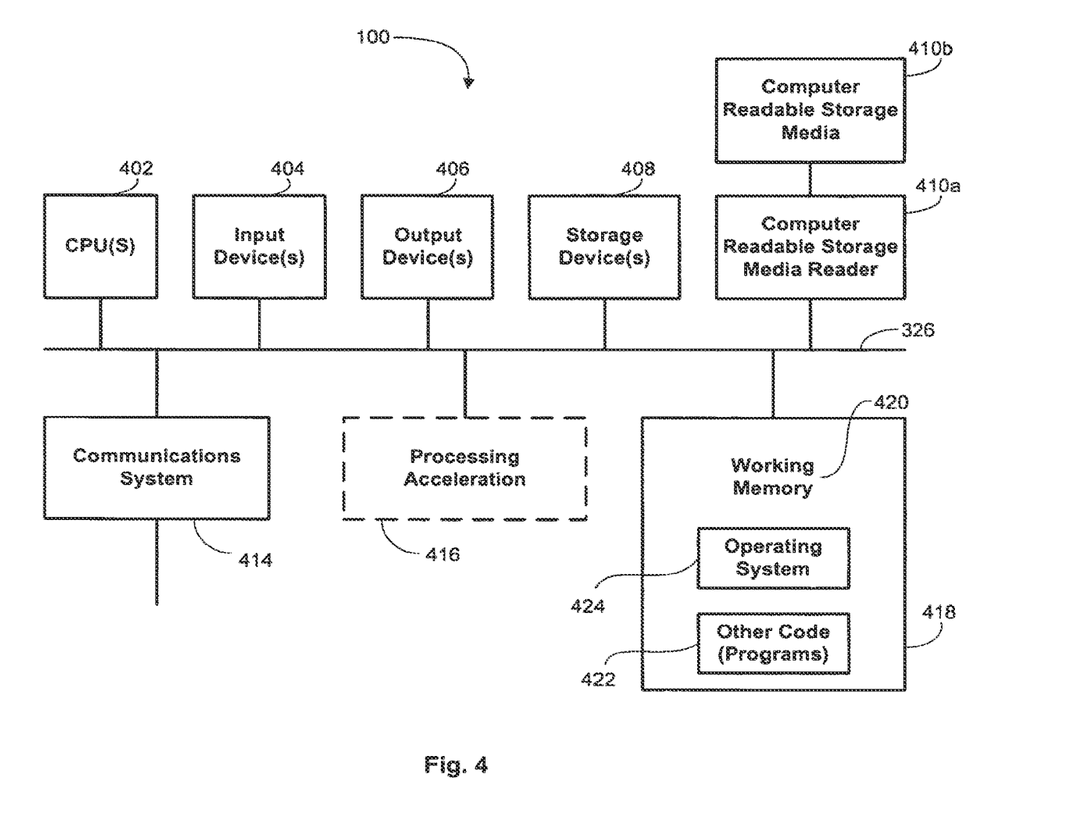
FIG. 4 is a schematic illustration of a computer system on which methods of the invention may be embodied.

FIG. 4 provides a schematic illustration of a structure that may be used to implement the host system 104. FIG. 4 broadly illustrates how individual system elements may be implemented in a separated or more integrated manner. The host system 104 is shown comprised of hardware elements that are electrically coupled via bus 426, including a processor 402, an input device 404, an output device 406, a storage device 408, a computer-readable storage media reader 410a, a communications system 414, a processing acceleration unit 416 such as a DSP or special-purpose processor, and a memory 418. The computer-readable storage media reader 410a is further connected to a computer-readable storage medium 410b, the combination comprehensively representing remote, local, fixed, and/or removable storage devices plus storage media for temporarily and/or more permanently containing computer-readable information. The communications system 414 may comprise a wired, wireless, modem, and/or other type of interfacing connection and permits data to be exchanged with the funds-transfer initiating systems 108, the payout systems 120, and the funds-transfer company to implement embodiments as described above.

The host system 104 also comprises software elements, shown as being currently located within working memory 420, including an operating system 424 and other code 422, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of optimizing, for a proposed electronic funds-transfer, selection of a funds-transfer system to execute the proposed electronic funds-transfer, the method comprising:

receiving, from an initiating system operated by a first funds-transfer system, parameters of the proposed electronic funds-transfer;

identifying, with the initiating system, a plurality of funds-transfer systems to complete the proposed electronic funds-transfer in accordance with the parameters of the proposed electronic funds-transfer, wherein each funds-transfer system of the plurality of funds-transfer systems comprises encrypted channels for transmitting electronic funds from a first location to a second location, the first and second locations being identified in the parameters of the proposed electronic funds-transfer;

identifying, at the initiating system, a plurality of fees, wherein each of the plurality of fees corresponds to a cost for a respective funds-transfer system to execute the proposed electronic funds-transfer;

displaying, at the initiating system, an identification of the plurality of funds-transfer systems and a fee associated with each of the plurality of funds-transfer systems, the fee being one of the plurality of fees;

receiving, at the initiating system, a selection of a funds-transfer system; and coordinating the proposed electronic funds-transfer based at least in part on the selection, wherein coordinating the proposed electronic funds-transfer comprises:

causing the selected funds-transfer system to conduct the proposed electronic funds-transfer; and causing printing, from a check printer, a check for an amount associated with the proposed electronic funds-transfer.

2. A system for optimizing, for a proposed electronic funds-transfer, selection of a funds-transfer system in a network of a plurality of funds-transfer companies to execute the proposed electronic funds-transfer, comprising:

one or more processors; and a memory coupled with the one or more processors, the memory configured to store instructions that, when executed by the one or more processors, cause the one or more processors to:

receive, parameters of the proposed electronic funds-transfer;

identify a plurality of funds-transfer systems to complete the proposed electronic funds-transfer in accordance with the parameters of the proposed electronic funds-transfer, wherein each funds-transfer system of the plurality of funds-transfer systems comprises encrypted channels for transmitting electronic funds from a first location to a second location, the first and second locations being identified in the parameters of the proposed electronic funds-transfer;

identify a plurality of fees, wherein each of the plurality of fees corresponds to a cost for a respective funds-transfer system to execute the proposed electronic funds-transfer;

display an identification of the plurality of funds-transfer systems and a fee associated with each of the plurality of funds-transfer systems, the fee being one of the plurality of fees;

receive a selection of a funds-transfer system; and send instructions to coordinate the proposed electronic funds-transfer based at least in part on the selected of the funds-transfer system, wherein coordinating the proposed electronic funds-transfer comprises:

cause the selected funds-transfer system to conduct the proposed electronic funds-transfer; and cause to print, from a check printer, a check for an amount associated with the proposed electronic funds-transfer.

3. A non-transitory, machine-readable medium having instructions stored thereon for causing at least one computer system to optimize, for a proposed electronic funds-transfer, selection of a funds-transfer system in a network of a plurality of funds-transfer companies to execute the proposed electronic funds-transfer, the instructions, when executed by the computer system, cause the computer system to perform operations comprising:

receiving parameters of the proposed electronic funds-transfer;

identifying a plurality of funds-transfer systems to complete the proposed electronic funds-transfer in accordance with the parameters of the proposed electronic funds-transfer, wherein each funds-transfer system of the plurality of funds-transfer systems comprises encrypted channels for transmitting electronic funds from a first location to a second location, the first and second locations being identified in the parameters of the proposed electronic funds-transfer;

identifying a plurality of fees, wherein each of the plurality of fees corresponds to a cost for a respective funds-transfer system to execute the proposed electronic funds-transfer;

displaying an identification of the plurality of funds-transfer systems and a fee associated with each of the plurality of funds-transfer systems, the fee being one of the plurality of fees;

receiving a selection of a funds-transfer system; and sending instructions to a host system to coordinate the proposed electronic funds-transfer based at least in part on the selected funds-transfer system, wherein coordinating the proposed electronic funds-transfer comprises:

causing the selected funds-transfer system to conduct the proposed electronic funds-transfer; and causing printing, from a check printer, a check for an amount associated with the proposed electronic funds-transfer.

4. The method of claim 1, further comprising:

transmitting, from the initiating system, to a first funds-transfer system of the plurality of funds-transfer systems, an identified fee associated with the first funds-transfer system to complete the proposed electronic funds-transfer; and receiving, at the initiating system, from the first funds-transfer system, a modified fee comprising a modification to the identified fee, wherein the modified fee is one of the plurality of fees.

5. The method of claim 1, wherein identifying the plurality of fees further comprises:

identifying an infrastructure associated with one or more funds-transfer systems; and determining, based at least in part on the identified infrastructure, at least one of the plurality of fees, wherein each of the plurality of fees corresponds to a cost for a respective funds-transfer system to execute the proposed electronic funds-transfer.

6. The method of claim 5, wherein an infrastructure associated with one or more funds-transfer companies includes a sub-infrastructure, wherein the infrastructure is operated by a first funds-transfer system and the sub-infrastructure is operated by a second funds-transfer system, the first funds-transfer system and the second funds-transfer system being distinct.

7. The method of claim 6, further comprising:

identifying a first fee associated with the sub-infrastructure; and identifying a second fee associated with the infrastructure, wherein the second fee includes the first fee and the second fee is one of the plurality of fees.

8. The method of claim 1, wherein the parameters of the proposed electronic funds-transfer comprises a sender identifier indicating a user associated with the proposed electronic funds-transfer and a sender history identifier that indicates past electronic funds-transfers associated with the user and one or more funds-transfer systems of the plurality of funds-transfer systems.

9. The method of claim 8, further comprising:
transmitting, from the initiating system, to a first funds-transfer system of the plurality of funds-transfer systems, an identified fee associated with the first funds-transfer system to complete the proposed electronic funds-transfer; and
receiving, at the initiating system, from the first funds-transfer system, a modified fee comprising a modification to the identified fee, wherein the modification to the identified fee is based at least in part on the sender history identifier.

10. The system of claim 2, wherein the instructions that when executed by the one or more processors further cause the one or more processors to:
transmit, to a first funds-transfer system of the plurality of funds-transfer systems, an identified fee associated with the first funds-transfer system to complete the proposed electronic funds-transfer; and
receive, from the first funds-transfer system, a modified fee comprising a modification to the identified fee, wherein the modified fee is one of the plurality of fees.

11. The system of claim 2, wherein the instructions that when executed by the one or more processors further cause the one or more processors to:
identify an infrastructure associated with one or more funds-transfer systems; and
determine, based at least in part on the identified infrastructure, at least one of the plurality of fees wherein each of the plurality of fees corresponds to a cost for a respective funds-transfer system to execute the proposed electronic funds-transfer.

12. The system of claim 11, wherein an infrastructure associated with one or more funds-transfer companies includes a sub-infrastructure, wherein the infrastructure is operated by a first funds-transfer system and the sub-infrastructure is operated by a second funds-transfer system, the first funds-transfer system and the second funds-transfer system being distinct.

13. The system of claim 12, wherein the instructions that when executed by the one or more processors further cause the one or more processors to:
identify a first fee associated with the sub-infrastructure; and
identify a second fee associated with the infrastructure, wherein the second fee includes the first fee and the second fee is one of the plurality of fees.

14. The system of claim 2, wherein the parameters of the proposed electronic funds-transfer comprises a sender identifier indicating a user associated with the proposed electronic funds-transfer and a sender history identifier that indicates past electronic funds-transfers associated with the user and one or more funds-transfer systems of the plurality of funds-transfer systems.

15. The system of claim 14, wherein the instructions that when executed by the one or more processors further cause the one or more processors to:
transmit, to a first funds-transfer system of the plurality of funds-transfer systems, an identified fee associated with the first funds-transfer system to complete the proposed electronic funds-transfer; and
receive, from the first funds-transfer system, a modified fee comprising a modification to the identified fee, wherein the modification to the identified fee is based at least in part on the sender history identifier.

16. The non-transitory, machine-readable medium of claim 3, the operations further comprising:
transmitting, to a first funds-transfer system of the plurality of funds-transfer systems, an identified fee associated with the first funds-transfer system to complete the proposed electronic funds-transfer; and
receiving, from the first funds-transfer system, a modified fee comprising a modification to the identified fee, wherein the modified fee is one of the plurality of fees.

17. The non-transitory, machine-readable medium of claim 3, the operations further comprising:
identifying an infrastructure associated with one or more funds-transfer systems; and
determining, based at least in part on the identified infrastructure, at least one of the plurality of fees, wherein each of the plurality of fees corresponds to a cost for a respective funds-transfer system to execute the proposed electronic funds-transfer.

18. The non-transitory, machine-readable medium of claim 17, wherein an operations associated with one or more funds-transfer companies includes a sub-infrastructure, wherein the infrastructure is operated by a first funds-transfer system and the sub-infrastructure is operated by a second funds-transfer system, the first funds-transfer system and the second funds-transfer system being distinct.

19. The non-transitory, machine-readable medium of claim 18, the operations further comprising:
identifying a first fee associated with the sub-infrastructure; and
identifying a second fee associated with the infrastructure, wherein the second fee includes the first fee and the second fee is one of the plurality of fees.

20. The non-transitory, machine-readable medium of claim 3, wherein the parameters of the proposed electronic funds-transfer comprises a sender identifier indicating a user associated with the proposed electronic funds-transfer and a sender history identifier that indicates past electronic funds-transfers associated with the user and one or more funds-transfer systems of the plurality of funds-transfer systems.

* * * * *